W. A. PENDRY.
ENGINEER'S VALVE.
APPLICATION FILED APR. 12, 1909.
959,798.
Patented May 31, 1910.
4 SHEETS—SHEET 1.
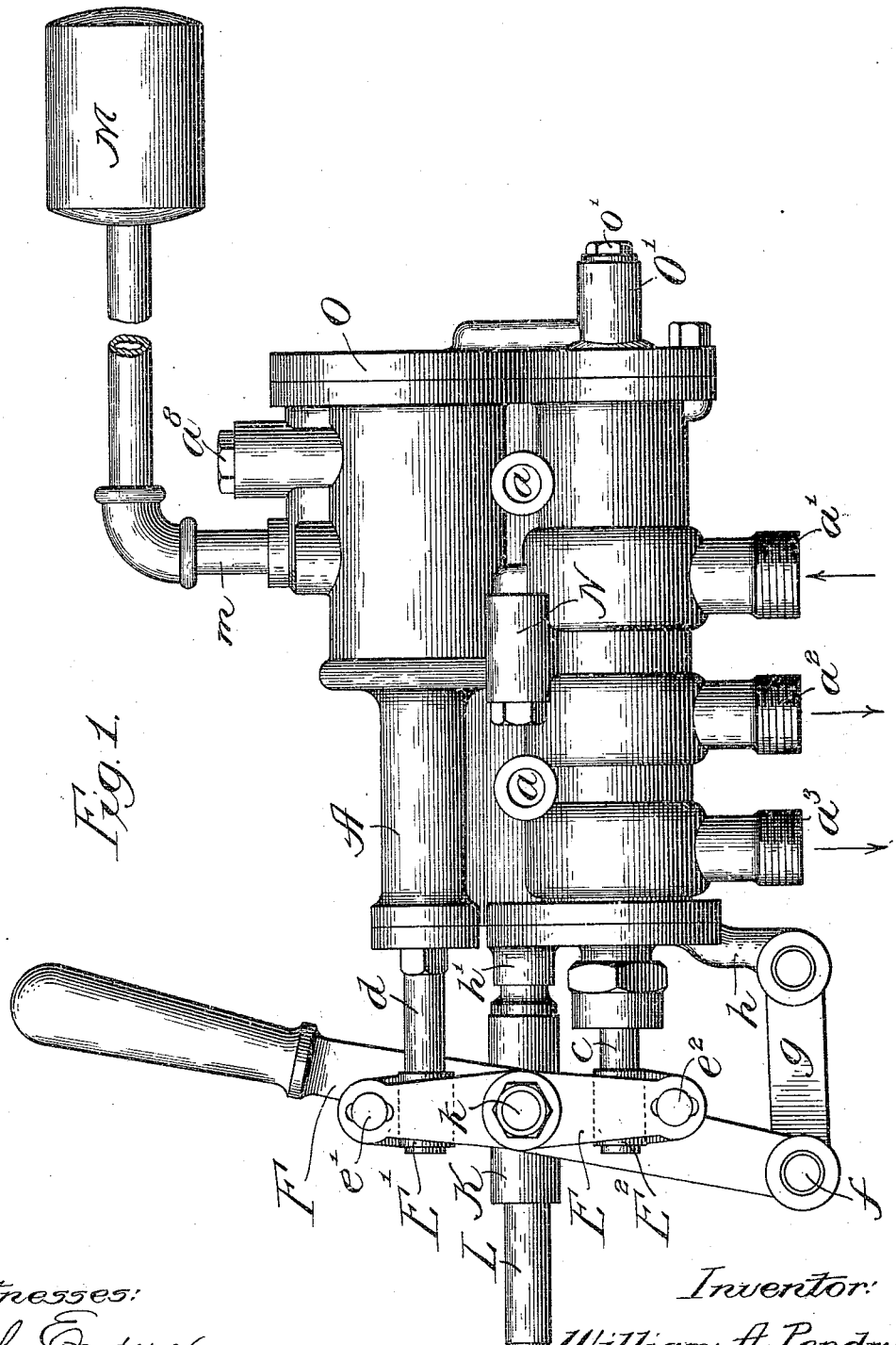

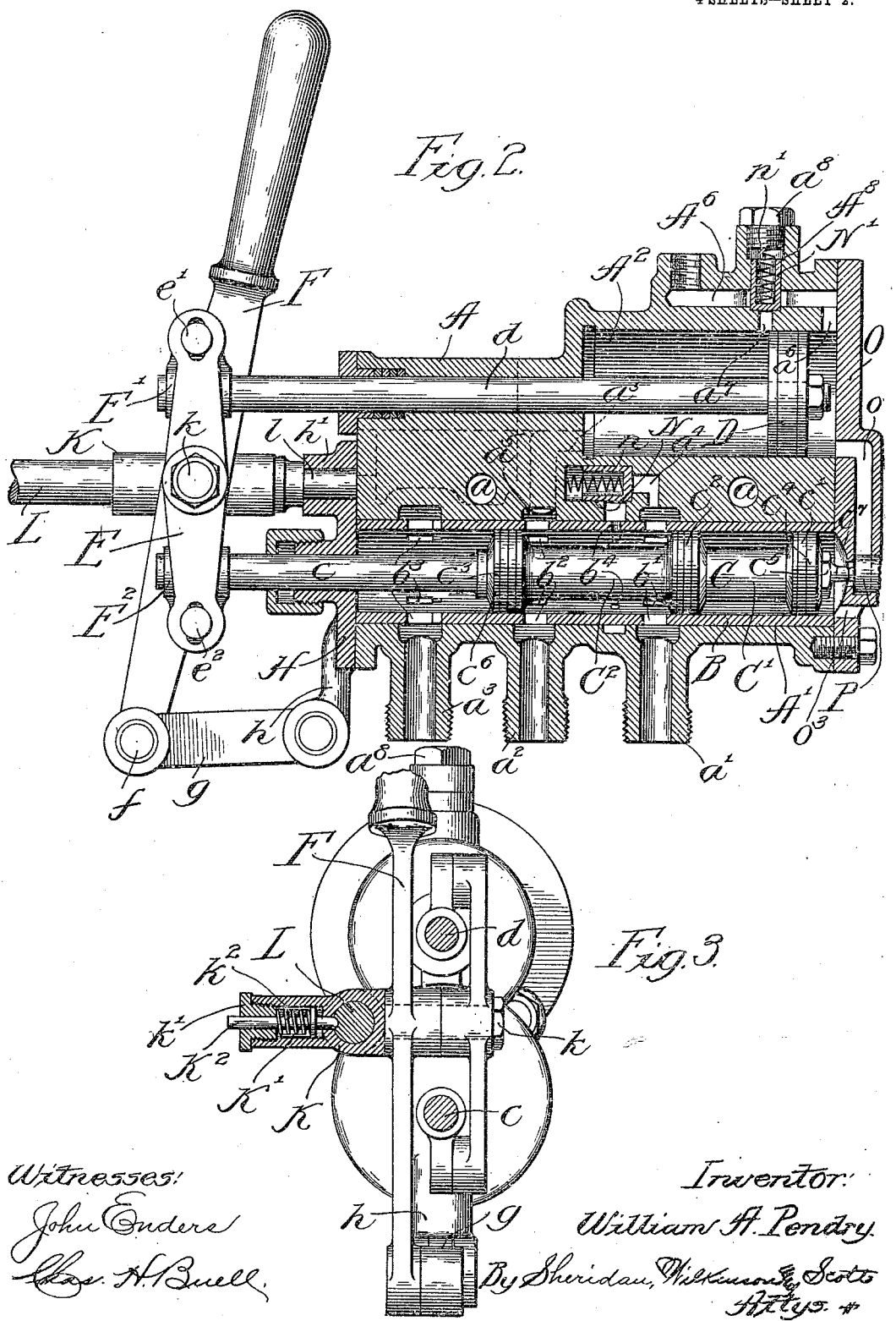

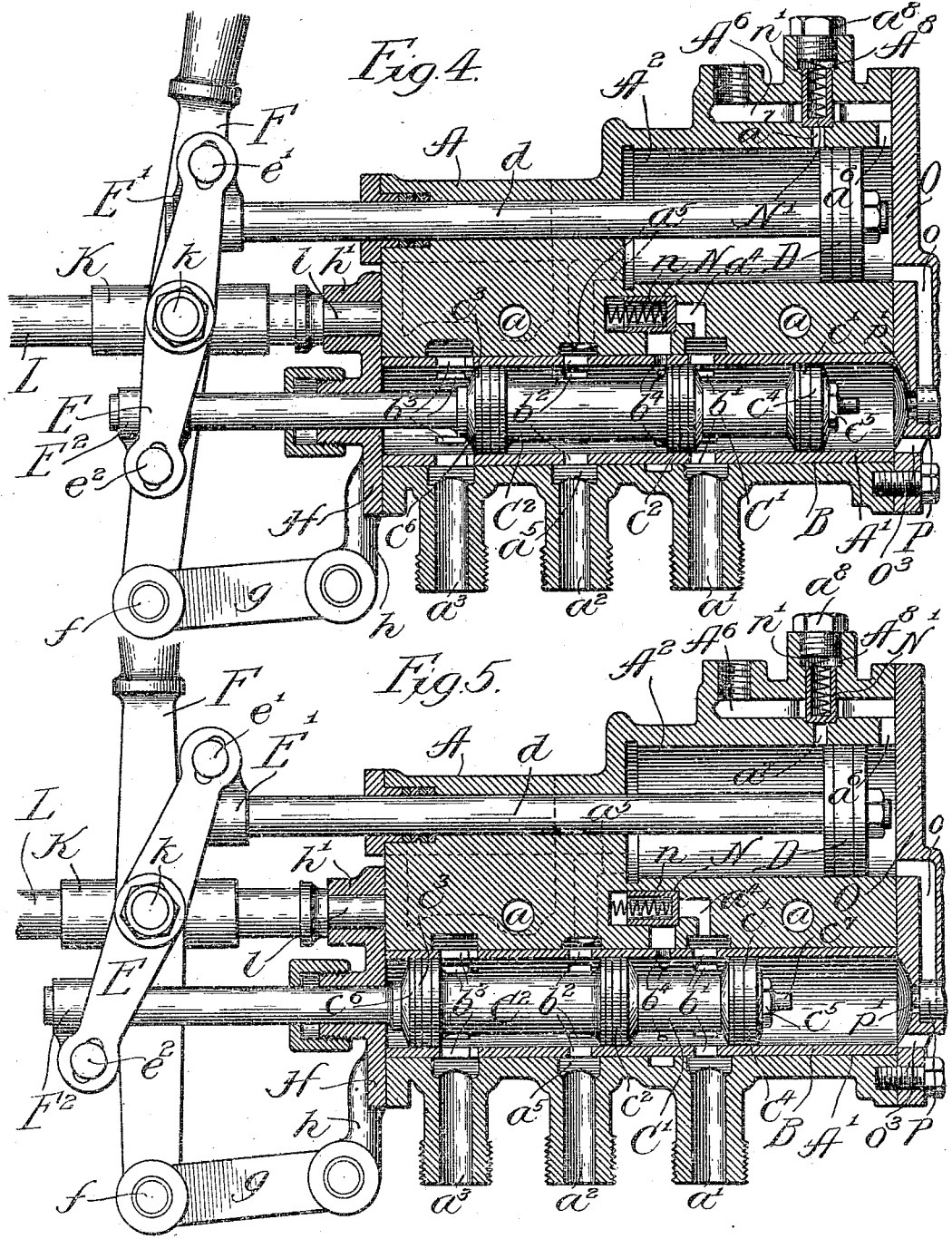

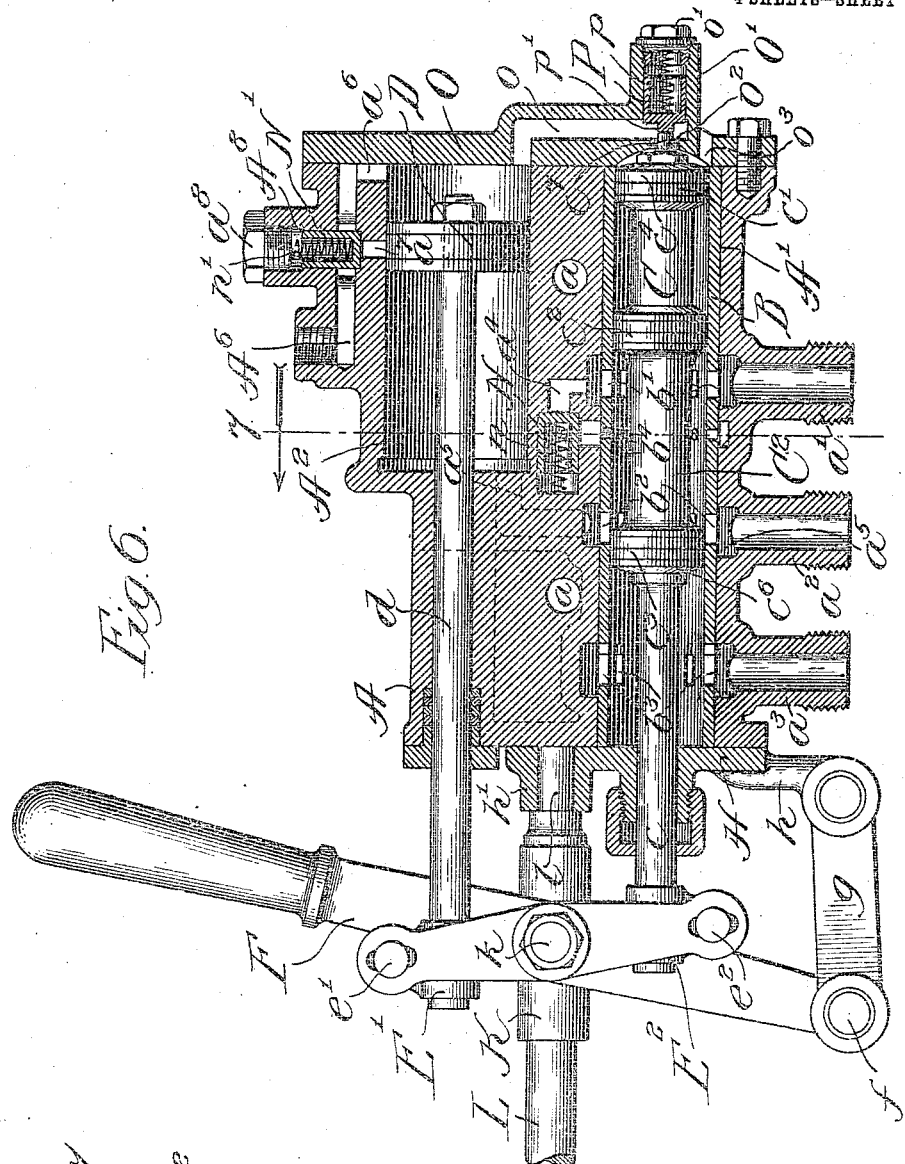
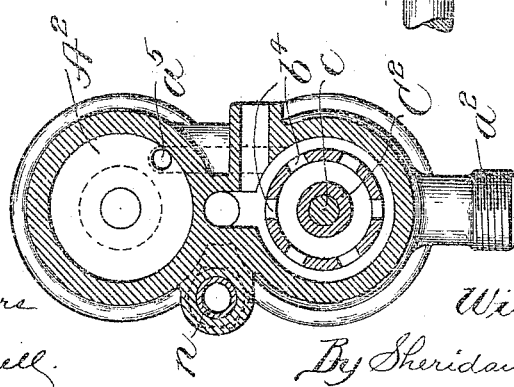

UNITED STATES PATENT OFFICE.

WILLIAM A. PENDRY, OF DETROIT, MICHIGAN.

ENGINEER'S VALVE.

959,798.  Specification of Letters Patent.  Patented May 31, 1910.

Application filed April 12, 1909. Serial No. 489,419.

*To all whom it may concern:*

Be it known that I, WILLIAM A. PENDRY, a citizen of the United States, residing at Detroit, in the county of Wayne and State of Michigan, have invented certain new and useful Improvements in Engineers' Valves, of which the following is a specification.

My invention relates in general to automatic air brakes, and more particularly to improvements in engineers' valves.

The primary object of my invention is to provide an improved engineer's valve which may be quickly and easily moved into its several positions to admit air from the main reservoir to the train pipe for releasing the brakes and for maintaining the normal running pressure, and also for exhausting pressure from the train pipe for service and emergency application of the brakes;
which will automatically discontinue the exhaust of train pipe pressure in service applications after a predetermined quantity of compressed air has been discharged; which will comprise piston and puppet valves, thereby obviating the wear incident to slide valves; and in which the parts of the valve mechanism may be readily accessible and may be easily assembled and disassembled.

A further object of my invention is to provide an improved engineer's valve which will be simple in construction, comparatively economical in manufacture, and efficient in operation.

My invention will be more fully described hereinafter with reference to the accompanying drawings, in which the same is illustrated as embodied in a convenient and practical form, and in which—

Figure 1 is an elevational view; Fig. 2, a central vertical section, showing the valve mechanism in release position; Fig. 3, an end elevation, looking from the left in Fig. 1, certain parts being shown in section; Fig. 4, a view similar to Fig. 2, showing the valve mechanism in running position; Fig. 5, a view similar to Fig. 2, showing the parts of the valve mechanism in emergency application; Fig. 6, a view similar to Fig. 2, showing the parts of the valve mechanism in the extreme position to which they are initially moved in releasing the brakes; and Fig. 7, a sectional view on line 7, 7, Fig. 6.

The same reference characters are used to designate the same parts in the several figures of the drawings.

Reference letter A indicates the casing in which the valve mechanism is located, which is preferably formed of an integral casting having a longitudinal valve cylinder A' and a piston cylinder $A^2$ formed therein. The casing A is provided with couplings $a'$, $a^2$ and $a^3$ which communicate, respectively, with conduits leading to the main reservoir, the train pipe and atmospheric exhaust port.

Located within the valve cylinder A' is a bushing B having extending therethrough circular series of ports $b'$, $b^2$ and $b^3$, which communicate with annular passages surrounding the bushing in which terminate the conduits extending through the respective couplings $a'$, $a^2$ and $a^3$.

Mounted to reciprocate within the bushing B is a balanced piston valve C consisting of a series of pistons $c'$, $c^2$ and $c^3$. The piston valve C may be conveniently formed by placing two spools C' and $C^2$ upon the piston rod $c$, the adjacent heads of the spools having suitable packing interposed between them to form the intermediate piston $c^2$, while the right end piston $c'$ is formed by inserting suitable packing between the adjacent head of the spool C' and a disk $c^4$ which is retained in position upon the end of the piston $c$ by a nut $c^5$. The left piston $c^3$ is formed by inserting packing between the adjacent head of the spool $C^2$ and a disk $c^6$ which surrounds the piston rod $c$ and engages a shoulder thereon.

D indicates a piston mounted to reciprocate within the cylinder $A^2$ and with which is connected a piston rod $d$ extending above and parallel to the piston-valve rod $c$. The ends of the rods $c$ and $d$, which project through the casing A, are pivotally connected to a floating lever E in any suitable manner, as for instance, by providing collars E' and $E^2$ which surround and are secured to the ends of the rods $d$ and $c$, and which are pivotally connected by studs $e'$ and $e^2$ to the opposite ends of the floating lever E.

F indicates the hand lever for manually operating the valve, which is pivoted at its lower end $f$ to a link $g$, the latter being fulcrumed upon a bracket $h$ depending from the head H of the piston valve cylinder A'. The lever F is pivotally connected intermediate of its ends to the center of the floating lever E by any suitable means, as, for instance, a stud $k$ projecting from a slide K, the latter being mounted to move longitudinally upon a guide rod L. The end $l$ of the guide rod L may be supported by engaging a bearing $h'$ formed in the head H of the piston valve cylinder. The slide K is provided with a chamber K' closed by a removable cap $k'$. Located within the chamber K' is a plunger $K^2$ the stem of which projects through and is guided by the cap $k'$. The opposite end of the plunger projects through the wall of the chamber K' and bears against the adjacent surface of the guide rod L, depressions being formed in the guide rod L at predetermined distances for facilitating the proper movement of the lever F. A spring $k^2$ surrounds the stem of the plunger $K^2$ and is interposed between the inner end of the cap $k'$ and a collar on the plunger, the tension of such spring serving to force the plunger into engagement with the rod L.

Extending from the air belt or annular passageway around the ports $b^2$ is a passageway $a^5$ which leads to the end of the cylinder $A^2$. The passageway $a^5$ is of such size as to place the cylinder $A^2$ in free communication with the train pipe so that the pressure in the cylinder $A^2$ is reduced concurrently with reductions in train pipe pressure.

$b^4$ indicates a circular series of small ports extending through the bushing B and communicating with an annular passageway in the adjacent wall of the valve cylinder A', such circular series of ports being located intermediate of the circular series of ports $b'$ and $b^2$. Located in a small chamber N, which communicates with the ports $b^4$, is a reducing valve $n$. The reducing valve $n$ is provided with a spring which normally seats the same against the end of a passage $a^4$ which leads from the annular passageway around the series of ports $b'$.

In Figs. 2, 4, 5 and 6, the reducing valve chamber N is shown as located between the valve cylinder A' and piston cylinder $A^2$, in order that the operation of the valve mechanism may be more readily understood. As a matter of fact, the reducing valve chamber N is located as shown in Figs. 1 and 7, slightly at one side of the displaced position in which it is shown in Figs. 2, 4, 5 and 6.

A port $a^6$ leads from the end of the piston cylinder $A^2$ to a passage $A^6$ which communicates with a conduit $m$ leading to a small reservoir M. A port $a^7$ extends through the wall of the cylinder $A^2$ at a point in advance of the port $a^6$ a distance slightly greater than the thickness of the piston D. The port $a^7$ communicates with the passage $A^6$, such communication being controlled by a check valve N' located in a small valve cylinder $A^8$. The cylinder $A^8$ is closed by a cap $a^8$ between which and the check valve N' is interposed a light spring $n'$. The passageway $A^6$ extends around the check valve N', so that the latter does not impede the free flow of air in the passageway $A^6$.

O indicates the end of the casing for the valve mechanism which serves as a cylinder head for both of the cylinders A' and $A^2$. A passage $o$ is formed in the head O and extends from the adjacent end of the cylinder $A^2$ to the inner end of a small valve cylinder O'. A valve P is located within the cylinder O', a closing spring $p$ being interposed between the valve and the cap $o'$ of the cylinder O'. The tension of the spring $p$ tends to seat the valve P against a port $o^2$ leading from the passage $o$ to the adjacent end of the cylinder A'. A port $o^3$ extends to the atmosphere through the portion of the end wall O of the casing which serves as a head for the cylinder A'. The valve P is provided with a stud $p'$ which projects into the port $o^2$ when the valve is seated, and is adapted to be engaged by a stud $c^7$ projecting from the adjacent end of the piston valve C, when the latter is in the extreme release position shown in Fig. 6.

The valve casing A may be supported in any suitable manner, as by means of bolts extending through transverse holes $a$, $a$.

The operation of my improved engineer's valve is as follows: When the mechanism is in the position shown in Fig. 2, the main reservoir is directly connected with the train pipe to release the brakes and recharge the auxiliary reservoirs. The main reservoir pressure passes through the coupling $a'$ into the annular passageway with which the coupling communicates, thence through the ports $b'$ into the interior portion of the bushing B between the pistons $c^2$ and $c^3$, thence through the series of ports $b^2$ and surrounding air belt to the coupling $a^2$ and thence to the train pipe. The full pressure of the main reservoir also passes through the passage $a^5$ to the interior of the cylinder $A^2$, thereby forcing the piston D toward the right and uncovering the port $a^7$, so that the pressure unseats the check valve N' and passes through the passages $A^6$, conduit $m$ to the reservoir M. The pressure also passes through the passage $A^6$ around the check valve N' through the port $a^6$ to the end of the cylinder $A^2$.

After the brakes have been released and the auxiliary reservoirs on the cars of the train recharged, the valve C is moved into the position shown in Fig. 4, by applying pressure to the hand lever F, such movement of the hand lever being communicated to the center of the floating lever E, thereby rocking the latter about its pivotal connection with the rod $d$, the latter being held immovable by the pressure to which the piston D is exposed. The floating lever E consequently swings about its central pivotal support and moves the piston valve C to the position shown in Fig. 4, in which the piston $c^2$ occupies a position intermediate of the series of ports $b'$ and $b^4$. In this position of the valve the pressure passes from the main reservoir through the ports $b'$ and passage $a^4$ to the reducing valve N, unseating the latter and passing through ports $b^4$ to the space within the bushing B between the pistons $c^2$ and $c^3$, the pressure then passing through the ports $b^2$ to the train pipe. The main reservoir pressure is consequently reduced by the check valve N to the normal train pipe pressure. When it is desired to make a service application of the brakes, the hand lever F is moved toward the left thereby oscillating the floating lever E about its pivotal connection with the rod $d$, and moving the piston valve to such a position that the piston $c^3$ uncovers the reduced ends of the ports $b^3$. The hand lever F is retained in the position to which it is moved through the engagement of the plunger $K^2$ with the proper recess in the guide rod K. In this position of the valve the piston $c^2$ occupies a position intermediate of the series of ports $b^4$ and $b^2$, thereby disconnecting the main reservoir from the train pipe and also from the passage leading to the cylinder $A^2$. The piston $c'$ prevents the exhaust of the main reservoir through the port $b^3$. Train pipe pressure passes through the ports $b^2$ into the space within the bushing B between the pistons $c^2$ and $c^3$, thence through the reduced ends of the ports $b^3$ to the atmospheric exhaust $a^3$. The pressure in the cylinder $A^2$ is also exhausted to the atmosphere through the passage $a^5$, ports $b^2$, and ports $b^3$.

The reduction of pressure in the cylinder $A^2$ at the left of the piston D permits the latter to be moved toward the left by the greater pressure to which its opposite surface is exposed. Such movement of the piston D rocks the floating lever E about its support upon the hand lever F, so that the piston valve is moved toward the right sufficiently to entirely cover the ports $b^3$ and thereby discontinue the exhaust of train pipe pressure. In order to apply the brakes with greater pressure, the hand lever is moved step by step toward the left, thereby repeatedly uncovering the restricted ends of the ports $b^3$ and venting train pipe pressure, the ports $b^3$ being successively closed, and the venting of train pipe pressure discontinued as the reduction of pressure in the cylinder $A^2$ permits the progressive movement of the piston D toward the left.

In order to make an emergency application of the brakes, the hand lever F is moved to the extreme left, thereby moving the valve into the position shown in Fig. 5, in which the train pipe pressure passes through the fully opened ports $b^3$ to the atmosphere, thereby quickly lowering the train pipe pressure. The pressure in the cylinder $A^2$ is coincidently lowered so that the piston D moves toward the left, but such movement of the piston is prevented from oscillating the floating lever by a continued pressure on the hand lever F, thereby maintaining the maximum exhaust from the train pipe pressure to quickly effect an emergency application of the brakes.

In order to release the brakes after either service or emergency application, the hand lever F is moved toward the right, thereby also moving the central fulcrum of the floating lever toward the right, until the piston valve has reached the extreme position shown in Fig. 6, in which the valve P is unseated. The pressure to which the right-hand surface of the piston D is exposed is consequently reduced by being exhausted to the atmosphere through the passage $o$, port $o^2$ and port $o^3$. The position of the port $a^7$ relative to the movement of the piston is such that said port is closed upon the first movement of the piston toward the left, thereby preventing train pipe pressure from passing through such port to the supplemental reservoir until the piston has been returned to its initial or normal position at the right-hand end of the cylinder. The piston D is consequently instantly moved from an extreme left-hand position to that shown in Fig. 2, thereby oscillating the floating lever E and moving the piston valve to the left sufficiently to permit the valve P to seat and discontinue the exhaust of pressure from the end of the cylinder $A^2$.

From the foregoing description, it will be observed that I have invented an improved engineer's valve which is exceedingly simple in construction; which comprises parts which are subjected to little wear and are readily accessible; which may be operated with little hand power; and which may be quickly moved to the several positions necessary to control the brakes.

While I have illustrated and described my invention with more or less detail, yet it is to be understood that I do not consider that my invention is restricted to any specific embodiment, but may be expressed in any physical forms coming within the terms of my claims.

I claim:

1. In an engineer's valve, the combination with a cylindrical valve casing communicating with a train pipe, main reservoir and exhaust port, of a piston valve in said casing for controlling the exhaust of pressure from the train pipe, of means for automatically moving said valve to discontinue the exhaust of train pipe pressure after a predetermined reduction thereof.

2. In an engineer's valve, the combination with a cylindrical valve casing communicating with a train pipe, main reservoir and exhaust port, of a manually operated piston valve in said casing for controlling the exhaust of pressure from the train pipe, of fluid pressure operative means for automatically moving said valve into position to discontinue the exhaust of train pipe pressure after a predetermined reduction thereof.

3. In an engineer's valve, the combination with a manually operated valve for controlling the exhaust of pressure from the train pipe, of a piston exposed to train pipe pressure on one side and to a balancing pressure equal to the normal train pipe pressure on its other side, and means operatively connecting said piston to said valve, whereby upon a predetermined reduction in train pipe pressure said piston will move said valve to discontinue the exhaust of train pipe pressure.

4. In an engineer's valve, the combination with a manually operated valve for controlling the exhaust of pressure from the train pipe, of a piston, a cylinder surrounding said piston in free communication with the train pipe at one side of the piston, a supplemental reservoir in communication with said cylinder at the opposite side of the piston, and means operatively connecting said piston with said valve, whereby the movement of said piston upon a reduction in the train pipe pressure will actuate said valve to discontinue the exhaust of train pipe pressure.

5. In an engineer's valve, the combination with a manually operated valve for controlling the exhaust of pressure from the train pipe, of a piston, a cylinder surrounding said piston in free communication with the train pipe at one side of the piston, a supplemental reservoir in communication with said cylinder at the opposite side of the piston, means for operatively connecting said piston with said valve, whereby the movement of said piston upon a reduction in train pipe pressure will actuate said valve to discontinue the exhaust of train pipe pressure, and means for exhausting pressure from said supplemental reservoir to effect the return of said piston to its initial position.

6. In an engineer's valve, the combination with a manually operated valve for controlling the exhaust of pressure from the train pipe, of a piston, a cylinder surrounding said piston in free communication with the train pipe at one side of the piston, a supplemental reservoir in communication with said cylinder at the opposite side of the piston, means for charging said supplemental reservoir from the train pipe when said piston is in its initial position, means operatively connecting said piston with said valve to discontinue the exhaust of train pipe pressure upon a predetermined reduction thereof, and means for exhausting pressure from said supplemental reservoir to effect a return of said piston to its initial position.

7. In an engineer's valve, the combination with a valve for controlling the exhaust of pressure from the train pipe, of a rod for actuating said valve, a piston exposed to train pipe pressure on one side and to a balancing pressure equal to the normal train pipe pressure on its other side, a piston rod connected to said piston, a floating lever pivotally connected at its ends to said valve rod and piston rod, and an operating lever pivotally connected to said floating lever intermediate of its ends.

8. In an engineer's valve, the combination with a valve for controlling the exhaust of pressure from the train pipe, of a rod for actuating said valve, a piston exposed to train pipe pressure on one side and to a balancing pressure on its other side, a piston rod connected to said piston, a floating lever pivotally connected at its ends to said valve rod and piston rod, a fixed guide rod, a sleeve upon said guide rod to which said floating lever is pivotally connected intermediate of its ends, and an operating lever pivotally connected to said sleeve.

9. In an engineer's valve, the combination with a valve for controlling the exhaust of pressure from the train pipe, of a rod for actuating said valve, a piston exposed to train pipe pressure on one side and to a balancing pressure on its other side, a piston rod connected to said piston, a floating lever pivotally connected at its ends to said valve rod and piston rod, a fixed rod, a sleeve upon said guide rod to which said floating lever is pivotally connected intermediate of its ends, an operating lever pivotally connected to said sleeve, and a detent carried by said sleeve adapted to engage notches in said guide rod.

10. In an engineer's valve, the combination with a valve chamber having ports communicating with a main reservoir, train pipe and exhaust, of a valve in said chamber for controlling said ports, a piston, a cylinder surrounding said piston in free communication with the train pipe at one side of said piston, a supplemental reservoir in communication with said cylinder at the opposite side of the piston, means operatively connecting said piston with said valve, and means actuated by said valve in release position to exhaust pressure from said supplemental reservoir.

11. In an engineer's valve, the combination with a valve chamber having ports communicating with a main reservoir, train pipe, and exhaust, of a valve in said chamber for controlling said ports, a piston, a cylinder surrounding said piston in free communication with the train pipe at one side of said piston, a supplemental reservoir in communication with said cylinder at the opposite side of the piston, means for charging said supplemental reservoir from the train pipe when said piston is in its initial position, means operatively connecting said piston with said valve, a normally seated valve controlling an exhaust port from said supplemental reservoir, and a projection on the end of said first-mentioned valve for unseating said normally seated valve to effect the return of said piston to its initial position.

12. In an engineer's valve, the combination with a manually operated piston valve for controlling the exhaust of pressure from the train pipe, of a piston, a cylinder surrounding said piston in free communication with the train pipe at one side of the piston, a supplemental reservoir in communication with the cylinder at the opposite side of the piston, means for charging said supplemental reservoir from the train pipe when said piston is in its initial position, means operatively connecting said piston with said piston valve to discontinue the exhaust of train pipe pressure, a normally seated valve for controlling an exhaust port from said supplemental reservoir, and a projection on the end of said piston valve for unseating said normally seated valve when said piston valve is moved to release position.

In testimony whereof, I have subscribed my name.

WILLIAM A. PENDRY.

Witnesses:
  ANNIE C. COURTENAY,
  GEO. L. WILKINSON.